(12) United States Patent
Wetmore

(10) Patent No.: US 9,294,186 B2
(45) Date of Patent: Mar. 22, 2016

(54) METHODS, SYSTEMS, AND COMPUTER PROGRAM PRODUCTS FOR PROVIDING UPLINK COLLISION IDENTIFICATION

(75) Inventor: Robert Evans Wetmore, Manhattan Beach, CA (US)

(73) Assignee: FOX DIGITAL ENTERPRISES, INC., Los Angeles, CA (US)

( * ) Notice: Subject to any disclaimer, the term of this patent is extended or adjusted under 35 U.S.C. 154(b) by 1921 days.

(21) Appl. No.: 11/946,410

(22) Filed: Nov. 28, 2007

(65) Prior Publication Data

US 2008/0130551 A1    Jun. 5, 2008

Related U.S. Application Data

(60) Provisional application No. 60/872,182, filed on Dec. 1, 2006.

(51) Int. Cl.
*H04B 7/185* (2006.01)

(52) U.S. Cl.
CPC .................... *H04B 7/1851* (2013.01)

(58) Field of Classification Search
CPC .................................................. H04B 7/1851
USPC ............ 370/310, 315, 316; 455/3.01, 3.02, 7, 455/11.1, 12.1
See application file for complete search history.

(56) References Cited

U.S. PATENT DOCUMENTS

| | | | |
|---|---|---|---|
| 4,745,599 A * | 5/1988 | Raychaudhuri | 370/348 |
| 4,876,737 A * | 10/1989 | Woodworth et al. | 455/12.1 |
| 5,003,534 A | 3/1991 | Gerhardt et al. | |
| 5,020,131 A * | 5/1991 | Isoe | 455/10 |
| 5,121,409 A * | 6/1992 | Goss | 375/130 |
| 5,589,837 A * | 12/1996 | Soleimani et al. | 342/359 |
| 5,661,724 A * | 8/1997 | Chennakeshu et al. | 370/324 |
| 5,822,310 A * | 10/1998 | Chennakeshu et al. | 370/317 |
| 5,974,315 A * | 10/1999 | Hudson | 455/427 |
| 6,381,228 B1 | 4/2002 | Prieto, Jr. et al. | |
| 6,493,322 B1 * | 12/2002 | Chennakeshu et al. | 370/252 |
| 6,665,518 B1 * | 12/2003 | Courtney et al. | 455/12.1 |
| 6,724,737 B1 * | 4/2004 | Boyden et al. | 370/316 |
| 6,757,264 B1 * | 6/2004 | Gayrard | 370/316 |
| 6,834,039 B1 * | 12/2004 | Kelly et al. | 370/229 |
| 7,079,505 B2 * | 7/2006 | Okunishi et al. | 370/321 |
| 2002/0105976 A1 * | 8/2002 | Kelly et al. | 370/519 |
| 2002/0197958 A1 * | 12/2002 | Collins et al. | 455/63 |
| 2003/0073436 A1 * | 4/2003 | Karabinis et al. | 455/429 |
| 2005/0208890 A1 * | 9/2005 | Karabinis | 455/12.1 |
| 2007/0097893 A1 * | 5/2007 | Rodriguez et al. | 370/310 |
| 2007/0153882 A1 * | 7/2007 | Eerola | 375/150 |

(Continued)

OTHER PUBLICATIONS

International Search Report, PCT/US07/24377, Apr. 24, 2008.

(Continued)

*Primary Examiner* — Chi H Pham
*Assistant Examiner* — Robert Lopata
(74) *Attorney, Agent, or Firm* — Cantor Colburn LLP

(57) ABSTRACT

A method for providing uplink collision identification includes at a first satellite uplink, transmitting a first signal to a satellite; at the first satellite uplink, transmitting a first unique satellite uplink identification signal to the satellite; at a satellite downlink, receiving the first signal and the first unique satellite uplink identification signal; and at the satellite downlink, identifying the first satellite uplink in response to the first unique satellite uplink identification signal.

15 Claims, 2 Drawing Sheets

(56) References Cited

U.S. PATENT DOCUMENTS

| | | | |
|---|---|---|---|
| 2008/0181291 A1* | 7/2008 | Zhou et al. | 375/227 |
| 2008/0212518 A1* | 9/2008 | Wells | 370/316 |
| 2009/0059841 A1* | 3/2009 | Laroia et al. | 370/328 |
| 2009/0310593 A1* | 12/2009 | Sheynblat et al. | 370/350 |
| 2010/0190507 A1* | 7/2010 | Karabinis et al. | 455/452.1 |

OTHER PUBLICATIONS

Canadian Application No. 2,671,035 Examiner's Report dated Nov. 13, 2014, 4 pages.

Canadian Application No. 2,671,035 Examiner's Report Issued Dec. 14, 2015, 3 pages.

* cited by examiner

METHODS, SYSTEMS, AND COMPUTER PROGRAM PRODUCTS FOR PROVIDING UPLINK COLLISION IDENTIFICATION

CROSS-REFERENCE TO RELATED APPLICATIONS

This application claims the benefit of U.S. provisional patent application 60/872,182 filed Dec. 1, 2006, the entire contents of which are incorporated herein by reference.

BACKGROUND

Exemplary embodiments relate generally to satellite communications and, more particularly, to methods, systems, and computer program products for providing satellite uplink identification to avoid signal collision.

Occasionally, either by accident or intention, more than one satellite uplink will transmit into the same transponder of a given satellite. This results in a mixing of the two transmissions, referred to in the art as double illumination. The satellite downlink receives the mixed signals, but cannot determine which satellite uplink is interfering with the intended signal. This may result in the proper transmission being terminated in an attempt to identify the source of the unwanted signal. In this scenario, the satellite downlink typically ceases distribution of signals to recipients until the unwanted signal can be terminated. Alternatively, recipients of the satellite downlink signal receive the unwanted signal. In either case, the recipients of the satellite downlink (e.g., viewers of programming) are not receiving the intended content.

Thus, there is a need in the art to identify the transmission source of a signal transmitted on a satellite uplink such that, in the event that a signal is unwanted, the transmitter may be promptly notified.

BRIEF SUMMARY

Exemplary embodiments relate to a method for identifying satellite uplink signals by transmitting a unique identification signal associated with the satellite uplink. The identification signal may be used by the satellite downlink to quickly identify the source of unwanted satellite signals.

Additional exemplary embodiments include systems and computer program products for identifying satellite uplinking signals.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
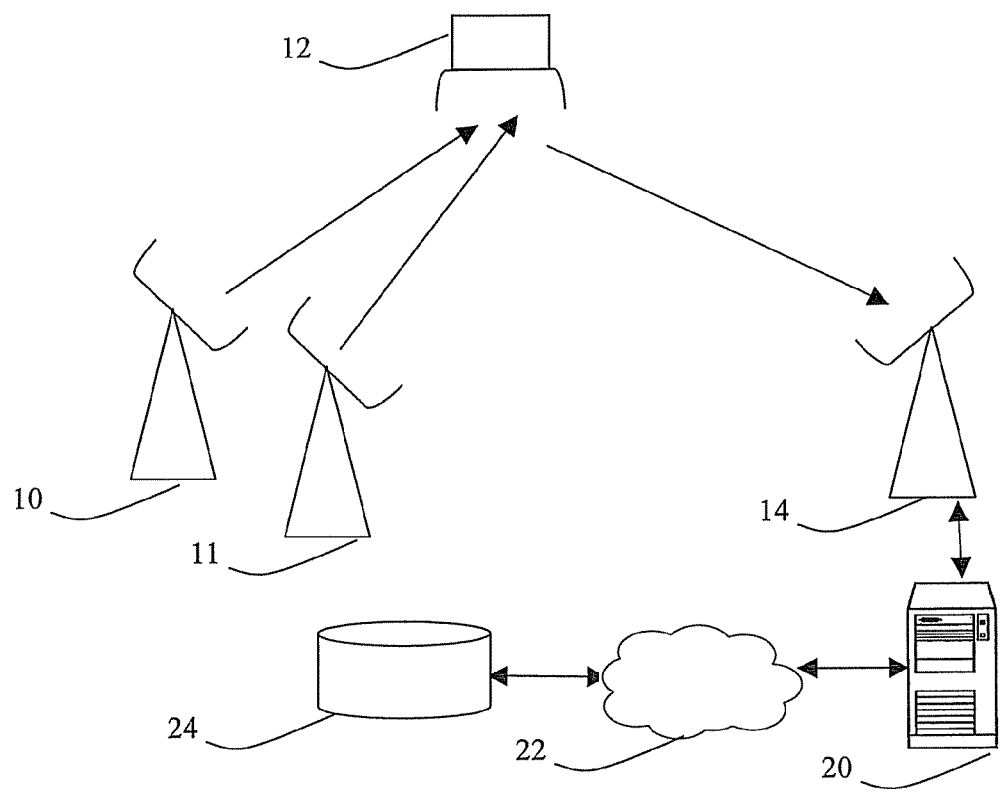
FIG. 1 is a high level block diagram of a satellite uplink and downlink.

FIG. 1 is a block diagram of an exemplary satellite system. In FIG. 1, a satellite uplink 10 transmits a signal to satellite 12 for distribution to a satellite downlink site 14, such as a satellite gateway for distribution of the satellite signal. The satellite uplink 10 transmits the signal on a certain carrier frequency or channel. The double illumination problem arises when a second satellite uplink 11 transmits a signal on the same channel as uplink 10. The satellite 12 receives both uplink signals and mixes the signals. The signal received at the satellite downlink 14 is a mix of the intended signal from satellite uplink 10 and the unwanted signal from satellite uplink 11.

Embodiments of the invention utilize a unique satellite uplink identification signal in the uplink transmission to identify the source of the satellite uplink<signal. Further, the frequencies used by each uplink are also specified by an industry entity. This allows the operator of the satellite downlink 14 to quickly identify the unwanted satellite uplink 11 and contact the unwanted satellite uplink to cease transmission on that particular channel. As described in further detail herein the satellite downlink 14 is associated with a processor 20, which accesses a database 24 over network 22. This allows for prompt identification of the unwanted satellite uplink 11.

Figure 2:
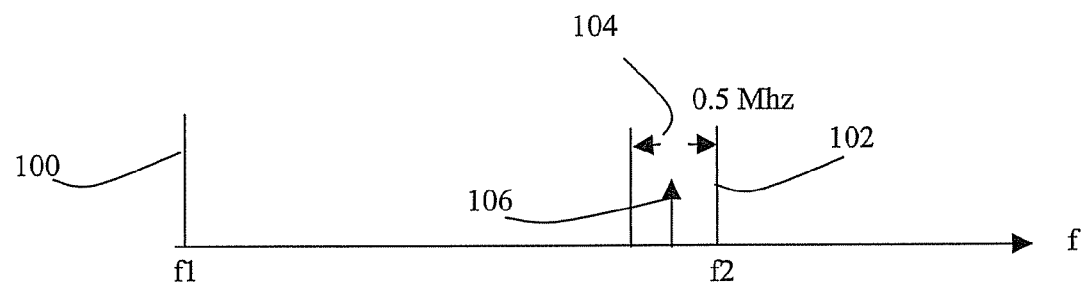
FIG. 2 illustrates a code transmitted in the satellite uplink.

FIG. 2 illustrates an example of the satellite uplink identification signal. FIG. 2 illustrates an uplink channel defined by a lower frequency band edge 100 and an upper frequency band edge 102. In embodiments of the invention, the satellite uplink identification signal is transmitted on a frequency 106 within a frequency band 104 adjacent the upper frequency band edge 102. In the exemplary embodiment shown in FIG. 2, frequency band 104 is 0.5 MHz wide. In the exemplary embodiment shown in FIG. 2, the uplink identification signal 106 uses 100 kHz, and thus may be placed in a variety of locations in the 0.5 MHz band 104. The position of the uplink identification signal 106 may be varied to prevent uplink identification signals from overlapping each other. Additionally, the location of the uplink identification signal 106 in frequency band 104 may be used to identity a specific uplink or a group of uplinks assigned to that frequency.

Figure 3:
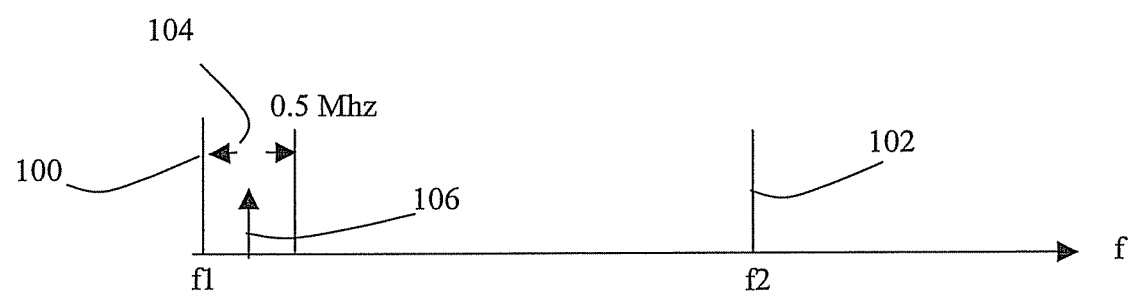
FIG. 3 illustrates a code transmitted in the satellite uplink in alternate embodiments.

FIG. 3 shows an alternate embodiment where the uplink identification signal 106 is transmitted in a frequency band 104 adjacent to the lower frequency band edge 100. In the exemplary embodiment shown in FIG. 3, the uplink identification signal 106 uses 100 kHz, and thus may be placed in a variety of locations in the 0.5 MHz band 104. The position of the uplink identification signal 106 may be varied to prevent uplink identification signals from overlapping each other. Additionally, the location of the uplink identification signal 106 in frequency band 104 may be used to identity a specific uplink or a group of uplinks assigned to that frequency.

The satellite uplink identification signal may be a continuous wave carrier modulated off/on by an identification code. In exemplary embodiments, the identification code may be a four character International Morse Code carrying the satellites uplink's unique identifier. The carrier frequency of the satellite uplink identification signal 106 should be transmitted at signal level (e.g., 20 db) below the main carrier. It is understood that other codes may be used and the use of International Morse Code is exemplary. For example, embodiments may represent the identification code using ASK, PSK, FSK type modulation.

The identification signal is added within the upconverter of each satellite uplink. Generation of the identification signal is integral to the upconverter and shall not be easily disabled. The identification carrier frequencies may be located on 400 hertz centers starting at the transponder edge and going down in frequency. The Morse Code identification may be transmitted at 5 words per minute. The Morse Code keying of the carrier shall be shaped with a Blackman-Harris digital filter so that the sidebands of the identification signal shall be at least 100 db below an adjacent identification carrier 200 hertz from the sideband.

The frequencies for each upconverter shall also be assigned by an industry entity and shall reside in a database 24. Also, the four-character identification code for each satellite uplink shall be assigned by an industry entity and placed in database 24 available to all concerned parties (including regulatory entities such as the FCC).

If a double illumination event occurs, the satellite downlink 14 receives the identification signal from both satellite uplinks 10 and 11. Presumably, the identification signal from satellite uplink 10 is recognized at the downlink 14. The identification code from unwanted satellite uplink 11 may be used by processor 20 (e.g., computer or server executing a computer program) to query database 24 containing identification codes for all satellite uplinks. The processor 20 may access database 24 over a network 22 (e.g., Internet, WAN, LAN, etc). The processor 20 and database 24 form an identification system that can automatically retrieve the identity of satellite uplink 11.

The database provides identification information for the satellite uplink 11, including contact information, telephone numbers, geographic location, etc. The operator of satellite downlink 14 may then contact unwanted satellite uplink 11 to request cessation of the interfering signal. In alternate embodiments, an operator at the satellite downlink 14 may recognize the identification code (e.g., recognize the Morse code) in the transmission of the unwanted satellite uplink and identify the source.

Additionally, the frequencies for each upconverter assigned by an industry entity are stored in database 24. Thus, the frequency of the signal from the unwanted satellite uplink 11 may be used to identify the operator of the satellite uplink 11. The uplink frequency and the identification code provide two mechanisms for identifying the satellite uplink 11 transmitting the unwanted signal.

As described heretofore, the exemplary embodiments can be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing uplink collision identification, the method comprising:
   at a first satellite uplink, transmitting a first signal to a satellite;
   at the first satellite uplink, transmitting a first unique satellite uplink identification signal to the satellite, wherein the first unique satellite uplink identification signal is a carrier that is separate from the first signal, said first unique satellite uplink identification signal identifying the uplink that transmits the first signal;
   at a satellite downlink, receiving the first signal and the first unique satellite uplink identification signal; and
   at the satellite downlink, identifying the first satellite uplink in response to the first unique satellite uplink identification signal, wherein
   the first signal is transmitted on a first frequency band having an upper frequency band edge, the first unique satellite uplink identification signal being transmitted on a frequency spaced a predetermined frequency from the upper frequency band edge.

2. A method for providing uplink collision identification, the method comprising:
   at a first satellite uplink, transmitting a first signal to a satellite;
   at the first satellite uplink, transmitting a first unique satellite uplink identification signal to the satellite, wherein the first unique satellite uplink identification signal is a carrier that is separate from the first signal, said first unique satellite uplink identification signal identifying the uplink that transmits the first signal;
   at a satellite downlink, receiving the first signal and the first unique satellite uplink identification signal; and
   at the satellite downlink, identifying the first satellite uplink in response to the first unique satellite uplink identification signal, wherein
   the first signal is transmitted on a first frequency band having a lower frequency band edge, the first unique satellite uplink identification signal being transmitted on a frequency spaced a predetermined frequency from the lower frequency band edge.

3. The method of claim 1 wherein:
   the predetermined frequency is within a band having a predefined width.

4. The method of claim 3 wherein:
   the band has a predefined width is about 0.5 MHz.

5. The method of claim 1,
   wherein the first unique satellite uplink identification signal is a carrier wave modulated by an identification code.

6. The method of claim 1,
wherein identifying the first satellite uplink in response to the first unique satellite uplink identification signal includes extracting an identification code from the identification signal and accessing a database of identification codes.

7. The method of claim 1 further comprising:
at a second satellite uplink, transmitting a second signal to the satellite;
at the second satellite uplink, transmitting a second unique satellite uplink identification signal to the satellite;
at the satellite downlink, receiving the second signal and the second unique satellite uplink identification signal; and
at the satellite downlink, identifying the second satellite uplink in response to the second unique satellite uplink identification signal.

8. A system for providing uplink collision identification, the system comprising:
a first satellite uplink transmitting a first signal to a satellite;
the first satellite uplink transmitting a first unique satellite uplink identification signal to the satellite, wherein the first unique satellite uplink identification signal is a carrier that is separate from the first signal, said first unique satellite uplink identification signal identifying the uplink that transmits the first signal;
a satellite downlink receiving the first signal and the first unique satellite uplink identification signal; and
an identification system identifying the first satellite uplink in response to the first unique satellite uplink identification signal, wherein
the first signal is transmitted on a first frequency band having an upper frequency band edge, the first unique satellite uplink identification signal being transmitted on a frequency spaced a predetermined frequency from the upper frequency band edge.

9. A system for providing uplink collision identification, the system comprising:
a first satellite uplink transmitting a first signal to a satellite;
the first satellite uplink transmitting a first unique satellite uplink identification signal to the satellite, wherein the first unique satellite uplink identification signal is a carrier that is separate from the first signal, said first unique satellite uplink identification signal identifying the uplink that transmits the first signal;
a satellite downlink receiving the first signal and the first unique satellite uplink identification signal; and
an identification system identifying the first satellite uplink in response to the first unique satellite uplink identification signal, wherein
the first signal is transmitted on a first frequency band having a lower frequency band edge, the first unique satellite uplink identification signal being transmitted on a frequency spaced a predetermined frequency from the lower frequency band edge.

10. The system of claim 8 wherein:
the predetermined frequency is within a band having a predefined width.

11. The system of claim 10 wherein:
the band having a predefined width is about 0.5 MHz.

12. The system of claim 8,
wherein the first unique satellite uplink identification signal is a carrier wave modulated by an identification code.

13. The system of claim 8, wherein
the identification system identifies the first satellite uplink in response to the first unique satellite uplink identification signal by extracting an identification code from the identification signal and accessing a database of identification codes.

14. The system of claim 8 further comprising:
a second satellite uplink transmitting a second signal to the satellite;
the second satellite uplink transmitting a second unique satellite uplink identification signal to the satellite;
wherein the satellite downlink receives the second signal and the second unique satellite uplink identification signal; and
wherein the identification system identifies the second satellite uplink in response to the second unique satellite uplink identification signal.

15. A computer program product for providing uplink collision identification, the computer program product comprising:
a non-transitory storage medium readable by a processing circuit and storing instructions for execution by the processing circuit for performing a method comprising:
at a first satellite uplink, transmitting a first signal to a satellite;
at the first satellite uplink, transmitting a first unique satellite uplink identification signal to the satellite, wherein the first unique satellite uplink identification signal is a carrier that is separate from the first signal, said first unique satellite uplink identification signal identifying the uplink that transmits the first signal;
at a satellite downlink, receiving the first signal and the first unique satellite uplink identification signal; and
at the satellite downlink, identifying the first satellite uplink in response to the first unique satellite uplink identification signal wherein
the first signal is transmitted on a first frequency band having an upper frequency band edge, the first unique satellite uplink identification signal being transmitted on a frequency spaced a predetermined frequency from the upper frequency band edge.

\* \* \* \* \*